(12) United States Patent
Boucher et al.

(10) Patent No.: US 6,931,263 B1
(45) Date of Patent: Aug. 16, 2005

(54) VOICE ACTIVATED TEXT STRINGS FOR ELECTRONIC DEVICES

(75) Inventors: Michael F. Boucher, Dacula, GA (US); Bart A. Smudde, Suwanee, GA (US)

(73) Assignee: Matsushita Mobile Communications Development Corporation of U.S.A., Suwanee, GA (US)

( * ) Notice: Subject to any disclaimer, the term of this patent is extended or adjusted under 35 U.S.C. 154(b) by 385 days.

(21) Appl. No.: 10/090,724

(22) Filed: Mar. 4, 2002

Related U.S. Application Data

(60) Provisional application No. 60/275,857, filed on Mar. 14, 2001.

(51) Int. Cl.[7] .................................................. H04B 1/38
(52) U.S. Cl. .................... 455/563; 704/201; 379/88.01; 379/88.02
(58) Field of Search ................................ 455/563, 466, 455/412.1; 379/88.14, 88.16, 88.02; 704/231, 704/201

(56) References Cited

U.S. PATENT DOCUMENTS

| | | | |
|---|---|---|---|
| 5,247,568 A | 9/1993 | Bergsman et al. ............ 379/67 |
| 5,559,860 A | 9/1996 | Mizikovsky .................. 379/58 |
| 5,630,207 A | 5/1997 | Gitlin et al. ............... 455/54.1 |
| 5,678,172 A | 10/1997 | Dinkens ..................... 455/5.1 |
| 5,797,124 A | 8/1998 | Walsh et al. ................ 704/275 |
| 5,821,874 A | 10/1998 | Parvulescu et al. .... 340/825.44 |
| 5,920,826 A | 7/1999 | Metso et al. ................. 455/557 |
| 5,966,663 A | 10/1999 | Gleason ....................... 455/466 |
| 6,014,428 A | 1/2000 | Wolf ........................ 379/88.11 |
| 6,021,336 A | 2/2000 | Kunihiro et al. ............ 455/575 |
| 6,088,428 A | 7/2000 | Trandal et al. ........... 379/88.02 |
| 6,148,287 A | 11/2000 | Yamakita ..................... 704/275 |
| 6,161,007 A | 12/2000 | McCutcheon et al. ...... 455/412 |
| 6,161,020 A | 12/2000 | Kim ........................... 455/466 |
| 6,188,909 B1 | 2/2001 | Alanara et al. ............. 455/466 |
| 6,205,342 B1 | 3/2001 | Oakes et al. ................ 455/566 |
| 6,507,643 B1 * | 1/2003 | Groner .................... 379/88.14 |
| 2002/0128837 A1 * | 9/2002 | Morin ........................ 704/255 |

* cited by examiner

*Primary Examiner*—Vivian Chin
*Assistant Examiner*—Sanh Phu
(74) *Attorney, Agent, or Firm*—Needle & Rosenberg, P.C.

(57) ABSTRACT

A system and method for associating text with a voice command and entering the associated text into an electronic device is disclosed. In one embodiment, the invention is a system for entering text into an electronic device, comprising, an input element for entering a text portion into the electronic device, a first memory for storing the text portion, a software code segment for recording a voice portion into the electronic device, and a second memory for storing the voice portion. The system also includes a software code segment for associating the voice portion with the text portion, a software code segment for associating the text portion with information to be entered in the electronic device, and voice recognition software to recall the text portion that is associated with the voice portion, where the input element inserts the text portion associated with the information to be entered into the electronic device.

20 Claims, 9 Drawing Sheets

US 6,931,263 B1

VOICE ACTIVATED TEXT STRINGS FOR ELECTRONIC DEVICES

CROSS REFERENCE TO RELATED APPLICATION

This application claims priority to, and the benefit of the filing date of, Provisional Application Ser. No. 60/275,857, filed on Mar. 14, 2001, entitled "Text Strings for Email and SMS Applications on Hand Held Wireless Devices," which is hereby incorporated into this document by reference in its entirety.

BACKGROUND OF THE INVENTION

1. Technical Field

This invention relates generally to electronic devices, and, more particularly, to a system for associating text characters with voice recognition in a communication device.

2. Related Art

With the increasing availability of efficient, low cost electronic modules, electronic devices are becoming more and more widespread. For example, the general availability and ease of use of personal digital assistants (PDAs) and portable communication devices, such as wireless telephones, are making these devices more and more popular. Some of the issues surrounding the use of these portable communication devices are the user interface (the manner in which the user interacts with the device) and the manner in which information is entered into the communication device.

For example, when sending electronic mail (email) or a short text message (SMS), the text is typically entered into a portable communication device using a user interfaces that includes a keypad. Unfortunately, the typical keypad associated with today's portable communication devices is generally a small device having many keys that are small and often difficult to actuate. This type of keypad is relatively difficult and tedious to use, especially if the user is entering a message that is longer than a few characters. Further, many messages include components that are common to all messages. For example, a greeting or a closing statement may typically be the same for each message.

Therefore, it would be desirable to have an efficient way of entering information into an electronicdevice.

SUMMARY

The invention provides a system and method for entering information into an electronic device. In one illustrative embodiment, the invention is a system for entering text into an electronic device, comprising an input element for entering a text portion into the electronic device, a first memory for storing the text portion, a software code segment for recording a voice portion into the electronic device, and a second memory for storing the voice portion. The system also includes a software code segment for associating the voice portion with the text portion, a software code segment for associating the text portion with information to be entered in the electronic device, and voice recognition software to recall the text portion that is associated with the voice portion, where the input element inserts the text portion associated with the information to be entered into the electronic device.

In another illustrative embodiment, the invention can be conceptualized as a method for entering text into an electronic device, the method comprising entering a text portion into the electronic device, storing the text portion in a memory, recording a voice portion into the electronic device, and storing the voice portion in the memory. The method also includes associating the voice portion with the text portion, using voice recognition to recall the text portion that is associated with the voice portion, associating the text portion with information to be entered in the electronic device, and inserting the text portion into the information to be entered in the electronic device.

Related computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale relative to each other, emphasis instead being placed upon clearly illustrating the principles of the invention. Moreover, in the figures, like reference numerals designate corresponding parts throughout the different views.

DETAILED DESCRIPTION OF THE PREFERRED EMBODIMENT

Figure 1:
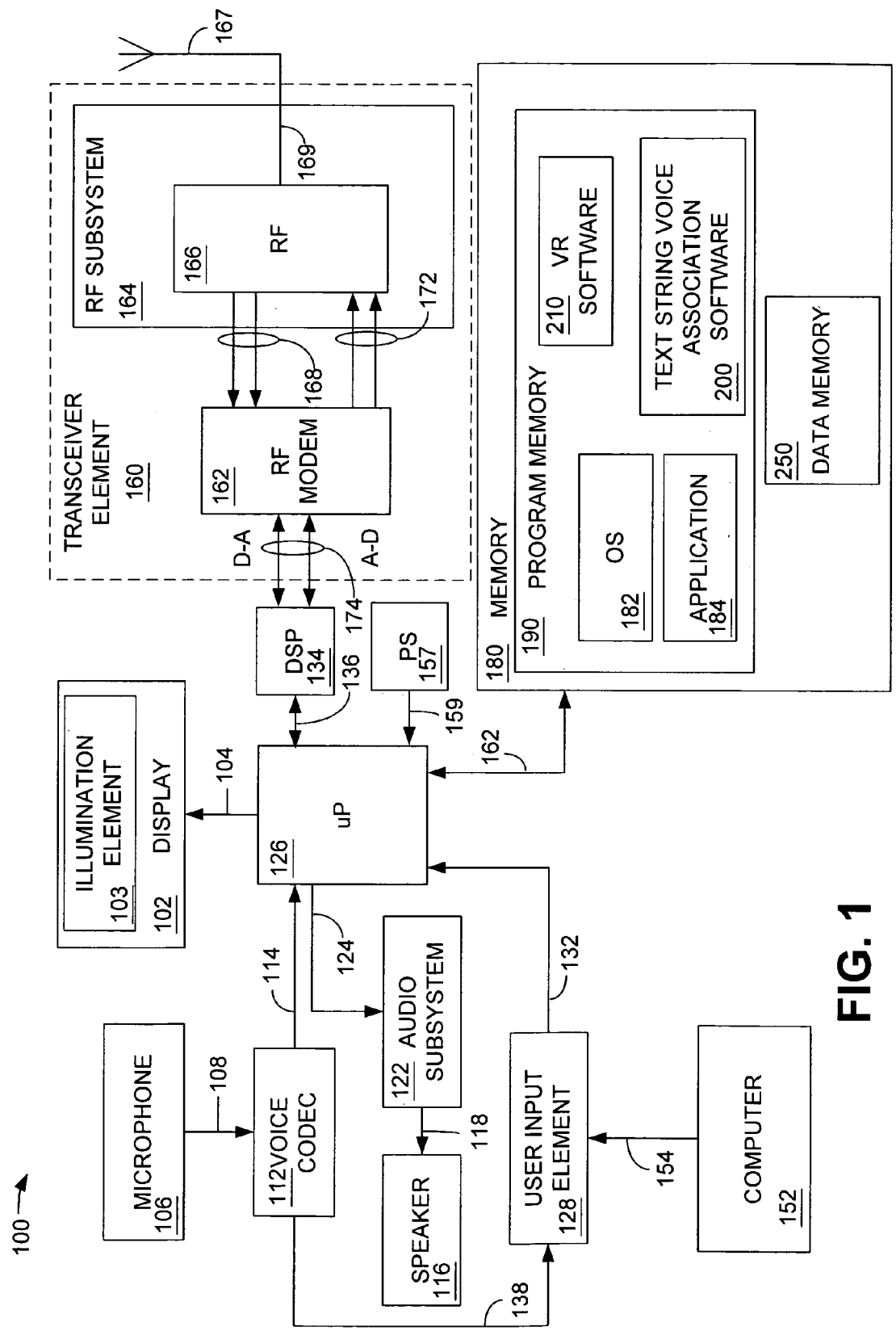
FIG. 1 is a block diagram illustrating a communication device constructed in accordance with the invention.

Wile described below as being particularly applicable to a portable communication handset, such as a cellular-type telephone, or a personal digital assistant (PDA), the system for associating text with a voice command is applicable to any electronic device in which it is desirable to have the ability to quickly and efficiently enter text information. Further, any information, including but not limited to, an email message, a short message system (SMS) message, a phonebook entry, address information, instant messaging text, or any other information, can be entered into the electronic device.

The system for associating text with a voice command can be implemented in software, hardware, or a combination thereof. In a preferred embodiment(s), selected portions of the system for associating text with a voice command are implemented in hardware and software. The hardware portion of the invention can be implemented using specialized hardware logic. The software portion can be stored in a memory and be executed by a suitable instruction execution system (microprocessor). The hardware implementation of the system for associating text with a voice command can include any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

The software portion of the invention is referred to below as the text string voice association software. As will be described in further detail below, the text string voice association software allows a user to enter often used text strings into a memory associated with the portable communication device and to record a voice utterance for storage in a memory, and automatically associate the voice utterance with the appropriate entered text string. This enables a user of the portable communication device to efficiently and quickly enter text information into a communication message by using voice recognition and a particular voice utterance associated with a particular text string. The text string voice association software of the invention, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

FIG. 1 is a block diagram illustrating a portable communication device 100 constructed in accordance with an embodiment of the invention. The portable communication device 100 generally includes a microprocessor 126 coupled to a memory element 180 via connection 162. The microprocessor 126 is also coupled to a display element 102 via connection 104, a digital signal processor (DSP) 134 via connection 136, and a power source 157 via connection 159. The display element 102, if illuminated, may include an illumination element 103.

The memory element 180 can include any one or a combination of volatile memory elements (e.g., random access memory (RAM), such as DRAM, SRAM, etc.) and non-volatile memory elements (e.g., ROM, Flash Memory, hard-drive, tape, CDROM, etc.). Moreover, the memory element 180 may incorporate electronic, magnetic, optical, and/or other types of storage media. Note that the memory element 180 can have a distributed architecture, where various components are situated remote from one another, but are accessible by the microprocessor 126.

The microprocessor 126 can be any special purpose or general-purpose processor capable of executing the instructions contained in the software (to be described below) contained within memory element 180.

The portable communication device 100 also includes a user input element 128 that is coupled to the microprocessor 126 via connection 132. The user input element 128 can be, for example but not limited to, a keypad, stylus and screen, a trackball, a touch-sensitive pad, a finger actuated pointer device, a microphone, such as microphone 106, (shown coupled to the user input element 128 through a voice coder/decoder (codec) 112 via connection 138), or any other interface for communicating user commands to the microprocessor 126. For example, if the portable communication device 100 is a cellular-type mobile telephone, the user input element may include a keypad for entering alphanumeric characters. If the portable communication device 100 is, for example, a PDA, then the user input element might be a combination of a keypad, mouse, and a stylus for marking notations on an input screen. The user input element 128 may also couple to an external computer 152 via connection 154. The computer 152 may also be used to enter information into the portable communication device 100.

The portable communication device 100 also includes an audio subsystem 122 and a speaker 116. The audio subsystem 122 is coupled to the microprocessor 126 via connection 124 and supplies an audio signal on connection 118 to the speaker 116. If the portable communication device 100 is a portable communication handset, the speaker 116 might be the speaker that the user places to his or her ear in order to listen to a voice conversation. If the portable communication device is a PDA, then the speaker 116 might provide audible output to the user. Furthermore, although omitted for simplicity, the audio subsystem 122 may also provide an interface to a headset type speaker device while the user input element 128 may provide an interface to an external microphone so that the portable communication device 100 can be used with a portable headset.

If the portable communication device 100 is, for example, a portable cellular-type telephone handset, then it will also include a microphone 106, a voice coder/decoder (codec) 112 and a transceiver element 160. The microphone 106 is coupled to the voice codec 112 via connection 108. The microphone converts audible sound energy into an electrical signal that is processed by the voice codec 112 and forwarded via connection 114 to the microprocessor 126. The microprocessor 126 processes the input on connection 114, as known to those having ordinary skill in the art.

The DSP 134 is coupled to the transceiver element 160 via connection 174. Connection 174, while shown as two bi-directional communication lines, may also include the digital-to-analog and analog-to-digital conversion required to transmit and receive information using the transceiver element 160, which are omitted for simplicity. The transceiver element 160 includes a radio frequency (RF) modem 162, coupled via connections 168 and 172 to RF electronics element 166. The RF electronics element 166 represents one or more components that process a modulated RF transmit signal received from the RF modem 162 via connection 172 and provide a received RF signal to the RF modem 162 via connection 168. The RF electronics element 166 couples to the antenna 167 via connection 169. The RF electronics element 166 includes the components necessary to upconvert, transmit, receive and downconvert an RF signal. The RF modem 162 modulates the RF signal prior to sending the signal to the RF electronics element 166 and demodulates a received signal from the RF electronics element 166.

As mentioned above, if the portable communication device 100 is a cellular-type telephone, then the transceiver element 160 includes all the necessary elements in order to receive a digital-to-analog converted signal via connection 174 and transmit that information using radio frequency energy. Similarly, the transceiver element 160 also includes all the circuitry necessary for receiving a radio frequency signal, and providing that signal via connection 174, for analog-to-digital conversion, to DSP 134 and then to the microprocessor 126.

The memory 180 generally includes program memory 190 and data memory 250. The software in program memory 190 may include one or more separate programs, each of which comprise one or more code segments, which are an ordered listing of executable instructions for implementing logical functions. In the example of FIG. 1, the software in the program memory element 190 includes an operating system 182, application software 184, text string voice association software 200, and voice recognition software 210. The application software 184 is executed by the microprocessor 126 in order to perform task specific operations of the portable communication device 100. The text string voice association software 200 includes the software code segments that are executed by the microprocessor 126 to enter and store a text string into data memory 250, record and store a voice recording (voice command) into data memory 250, and associate the text string with the recorded voice command. The text string voice association software 200 also includes the software code segments for recalling an associated text string when prompted by an associated voice recording, and for inserting the recalled text string into an appropriate location in a communication message. The voice recognition software 210 includes the code segments that enable a user's voice to be recognized and converted into electrical signals that are stored in the data memory 250.

With respect to the operating system 182, any available operating system that can be used to execute the normal functionality of the portable communication device 100 can be used. For example, if the portable communication device 100 is a PDA, a suitable operating system might be the Windows CE operating system, available from Microsoft Corporation of Redmond, Wash. If the portable communication device 100 is a cellular-type mobile communication device, then the operating system 182 may be a proprietary operating system designed by the manufacturer of the device 100.

The memory 180 also includes data memory 250. The data memory 250 stores the recorded text strings and voice commands, and includes the memory locations in which the stored text strings and associated voice commands are located. When a user enters text information into the portable communication device 100, one or more text strings may be recalled using voice recognition and inserted at a desired location in a communication message.

Figure 2:
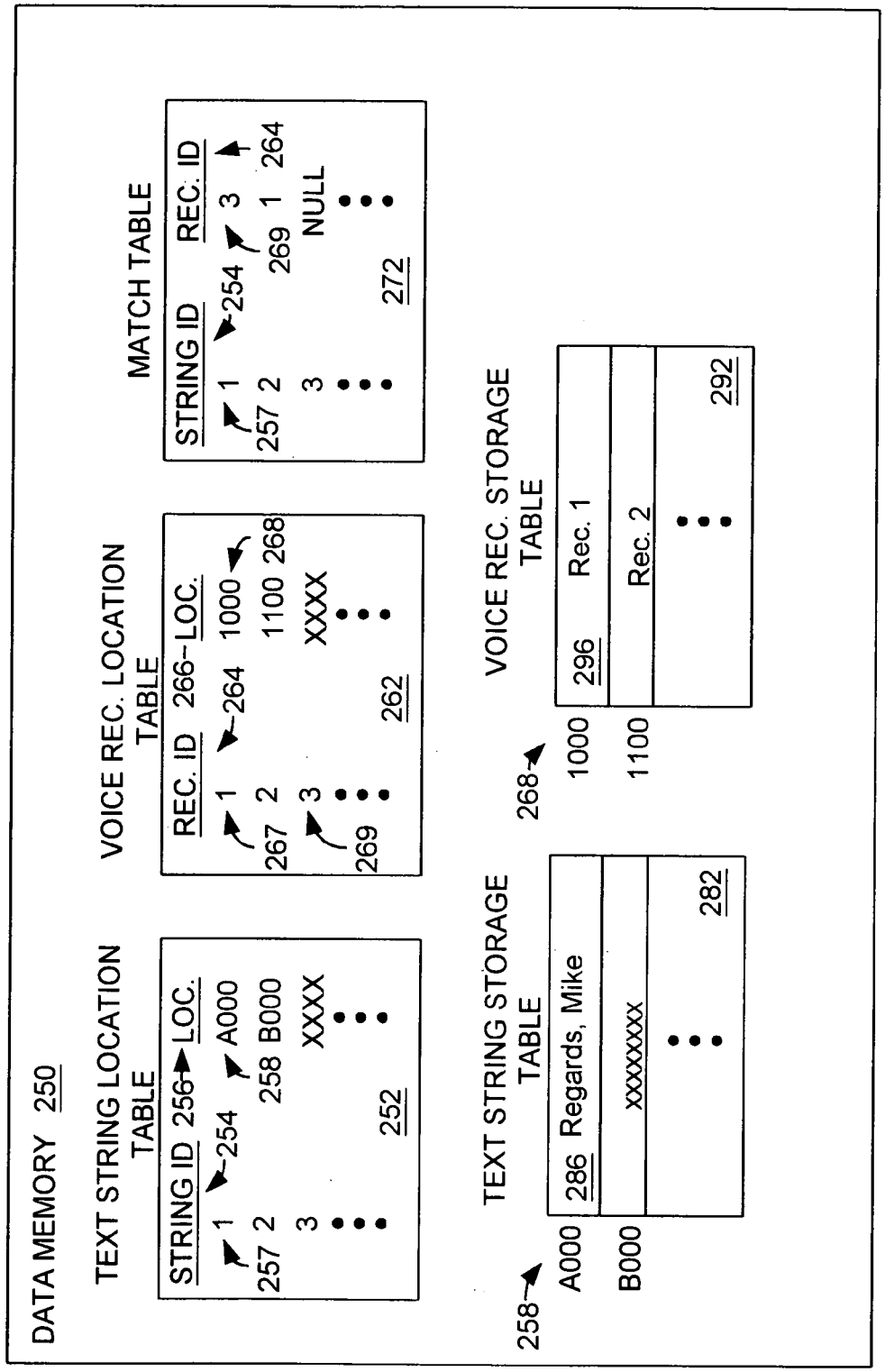
FIG. 2 is a block diagram illustrating portions of the memory of FIG. 1.

FIG. 2 is a block diagram illustrating portions of the data memory 250 of FIG. 1. The data memory 250 in FIG. 2 illustrates one example of the manner in which the data memory 250 can be configured and the text string voice association software 200 implemented. In the example shown in FIG. 2, the data memory 250 includes a number of tables into which text portions and voice portions are stored.

The data memory 250 includes a text string location table 252, a voice recording location table 262, a match table 272, a text string storage table 282 and a voice recording storage table 292. The text string location table 252 stores the locations of text strings entered by a user of the portable communication device 100 into unique memory locations within the data memory 250. A text string identifier (ID) 254 and a location 256 define the location in the text string storage table 282 into which a particular text string is stored. For example, a first exemplar text string ID 257 (that corresponds to a particular text string) is stored at a location 258 within the text string storage table 282. It should be noted that while illustrated using hexadecimal (hex) notation, the location of each text string could be identified using any notation convention. Furthermore, in the example shown in FIG. 2, only three text strings are identified as being stored in the text string location table 252. However, any number of text strings may be stored.

The voice recording location table 262 includes a voice recording identifier (ID) 264 and a location identifier 266. The voice recording location table 262 is used to store the location of voice recordings that will be associated with particular text strings (stored in text string storage table 282). For example, a first voice recording 267 is illustrated in the voice recording location table 262 as stored at location 268 (which corresponds to hex address 1000). Similarly as described above with respect to the text string location table 252, the voice recording location table 262 includes three voice recordings, each stored in a unique location 266 in the voice recording storage table 292.

The data memory 250 also includes a match table 272. The match table 272 associates a text string identifier 254 with a voice recording identifier 264. For example, in the match table 272, the first text string identifier 257 (as stored in the text string location table 252) is associated with a third voice recording identifier 269 (as stored in voice recording location table 262). In this manner, any text string can be associated with any of a plurality of voice recordings. Further, through the use of an edit feature to be described below, a voice command associated with a text string can be changed or modified, resulting in a non-permanent association between the voice command and the text string.

The data memory 250 also includes a text string storage table 282. The text string storage table 282 illustrates the text strings as stored at a particular memory address. For example, the text string "Regards, Mike" 286 is stored in memory location 258, which corresponds to the hex address A000. In this manner, the portable communication device 100 can store a large number of text strings in unique memory locations. Similarly, the voice recording storage table 292 shows a memory location associated with each stored voice recording. For example, a first voice recording 296 is stored in the memory location 268 (corresponding to hex address 1000). Other voice recordings are similarly stored in other memory locations in the voice recording storage table 292.

While described as being located on the same electronic device (i.e., the portable communication device 100), the text and voice need not be stored on the same device. For example, if the portable communication device 100 is coupled to a processing device, such as a personal computer (PC), it would be possible to store the voice command on the PC and store the text strings on the phone, or vice versa. Further, perhaps both text strings and voice commands could be stored remote form the device 100 in a database, and the device 100 connects to the database (via, for example, phone call, a bluetooth interface, or some other mechanism), to use the remotely stored information to insert text strings into different device applications. All such variations are possible using the concepts of the invention.

Figure 3:
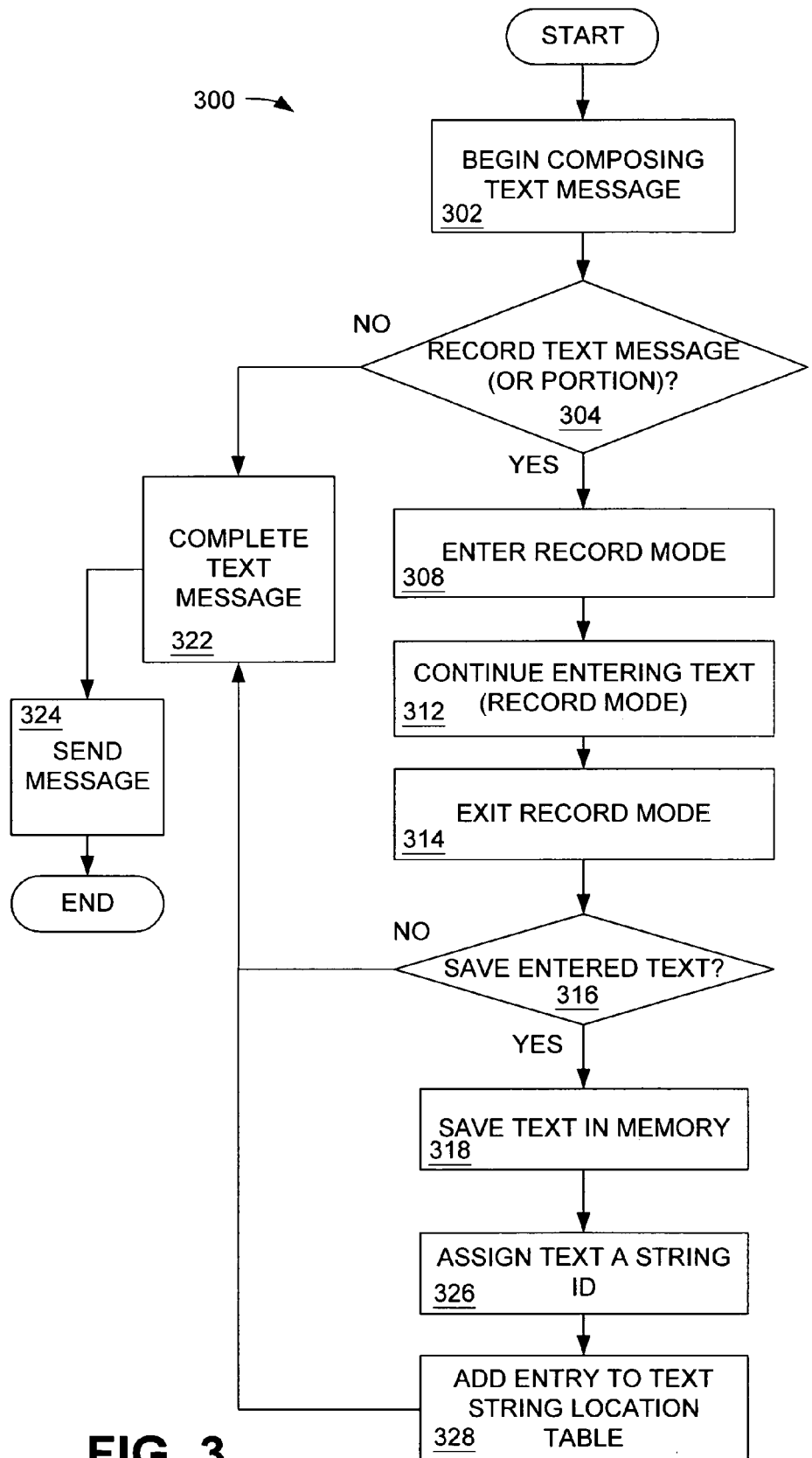
FIG. 3 is a flow chart describing one exemplar manner in which a user enters and stores a text string in the data memory of FIG. 2.

FIG. 3 is a flow chart 300 describing one exemplar manner in which a user enters and stores a text string in the data memory of FIG. 2. In block 302 a user of the portable communication device 100 begins composing a text message. For example, the user might use a keypad associated with the user input element 128 (FIG. 1) to begin composing the text message.

In block 304, as the user is composing the text message, the user determines whether a particular text string is to be entered and stored in the portable communication device 100 by the text string voice association software 200 of FIG. 1. If the text is not to be entered and stored in memory, then, in block 322, the user completes the text message, and in blocks 324 sends the text message. If however, in block 304, the user determines that he or she wishes to record and store a particular text string, then, in block 308, the user enters a text record mode. This can be accomplished in various ways, and for example, can be accomplished by pressing a particular button associated with the user input element 128. Alternatively, a multi-function button may be used.

In block 312, the user continues entering text. However, the text is now being recorded by the portable communication device 100. In block 314, after the user has completed entering text that he or she wishes to record and store, the record mode is exited. Similar to entering the record mode, this can be accomplished by actuating a particular button or actuator on the user input element 128 of FIG. 1.

In block 316, it is determined whether the entered text is to be saved. If, for one reason or another, the user chooses not to save the entered text, then, in block 322 the text message is completed and in block 324 the message is sent.

If, however, in block 316 the user desires to save the entered text, then, in block 318 the entered text is saved in the data memory 250, and in particular, is saved to a unique location in the text string storage table 282, as described above with respect to FIG. 2.

In block 326, the stored string is assigned a string ID 254 (FIG. 2). Then, in block 328, an entry is added to the text string location table 252. The entry comprises string ID 254 and the address of the string location 256. After the text string location table 252 is updated, the process transfers to block 322, where the message is completed.

Figure 4A:
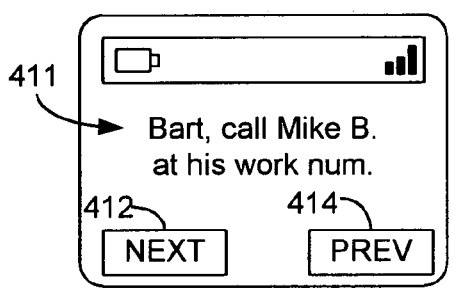
FIGS. 4A through 4E are graphical illustrations collectively illustrating exemplar screen shots of a portable communication device employing the method described in FIG. 3.

FIGS. 4A through 4E are graphical illustrations collectively illustrating exemplar screen shots of a portable communication device 100 employing the method described in FIG. 3. The screen shots may be displayed to the user of the portable communication device 100 via the display 102 (FIG. 1). In FIG. 4A, the screen shot 410 includes text 411 that is entered by a user via the user input element 128. The screen shot 410 also includes a "NEXT" button 412 and a previous ("PREV") button 414. As shown in FIG. 4A, a user has begun typing a message and has stopped before entering a telephone number because the user has decided that he or she wants to record the phone number as a text string in accordance with an aspect of the invention.

Figure 4D:
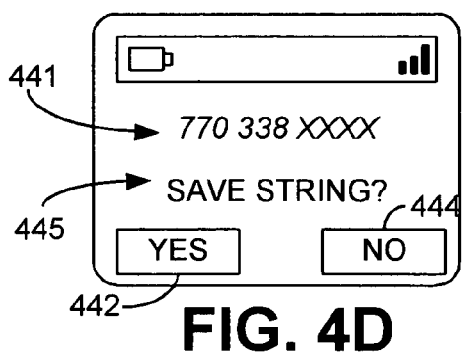
Figure 4B:
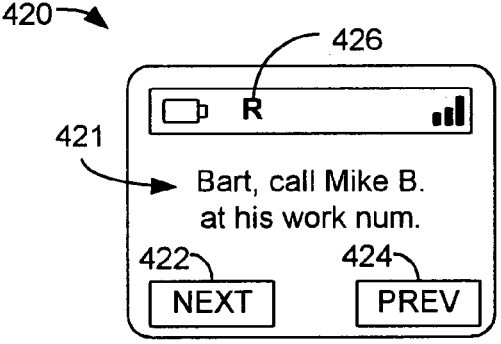

In FIG. 4B, the screen shot 420 indicates that a user has entered a record mode by an appropriate command entered via the user-input element 128. As shown in FIG. 4B, the "R" 426 indicates that the portable communication device 100 is now in a text record mode.

Figure 4E:
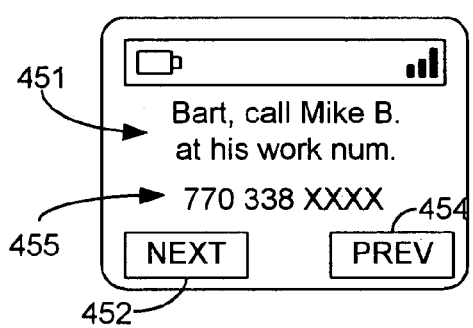
Figure 4C:
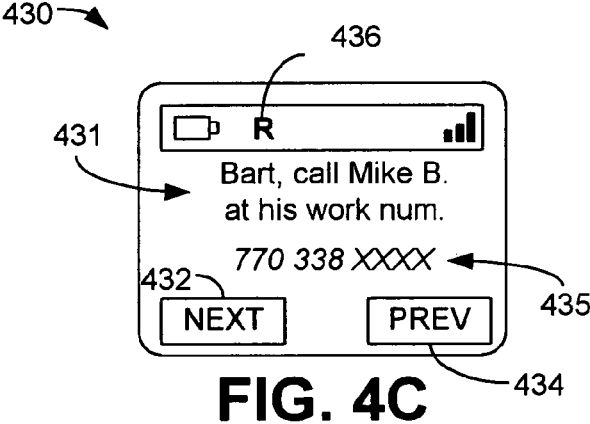

In FIG. 4C, the screen shot 430 shows that the user has now entered a phone number 435. Once text recording has begun there are many ways to indicate that the text is being recorded. As shown in FIG. 4C, the bold indicator "R" 436 indicates that the portable communication device 100 is in record mode, and the italics characters of the phone number 435 indicate that the text string that comprises the phone number is being recorded. It should be mentioned that many alternative ways of indicating that text is being recorded might be implemented. After the phone number 435 has been entered, and if the user has completed entering the text that he or she desires to save, the user can exit the record mode as described above.

In FIG. 4D, the screen shot 440 presents the user with the question "Save String?" 445. In this manner, when the text recording has been completed, the portable communication device 100 queries the user to determine whether the text string that has been entered, in this example "the phone number," is to be stored. If the user desires to save the text string, then the "YES" button 442 can be actuated. When so actuated, the phone number is saved to an appropriate location in the data memory 250, assigned a string ID 254, and listed in the text string location table 252. If the user decides not to save the entered text string, then the user can actuate the "NO" button 444.

In FIG. 4E, once the user has indicated in FIG. 4D whether or not he or she wishes to save the text string (the phone number 435 of FIGS. 4C and 4D) the user is returned to the screen shot 450 to complete the text message. As shown in FIG. 4E, the phone number no longer appears in italics, indicating either that the text was saved or that the user decided not to save the text.

Figure 5:
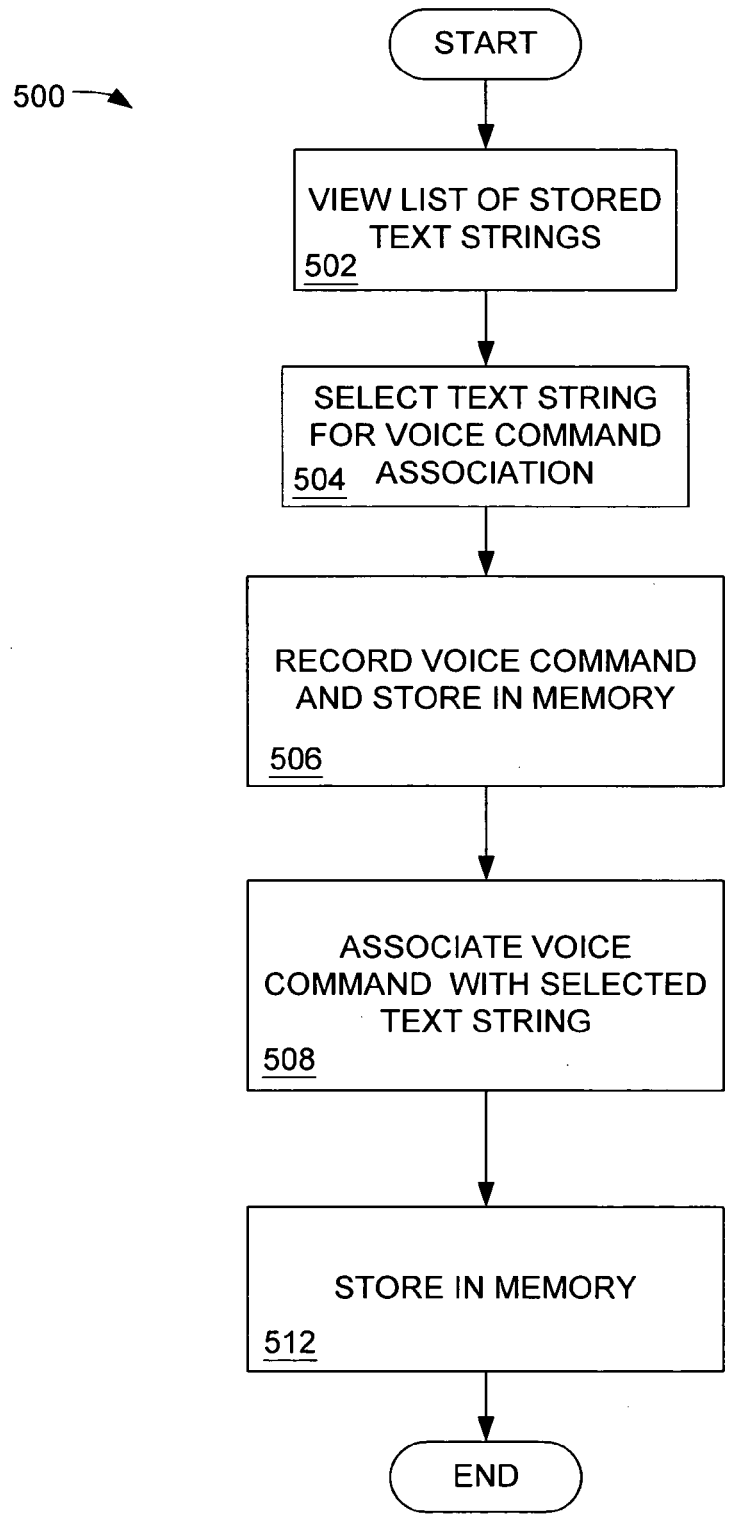
FIG. 5 is a flow chart illustrating the operation of an aspect of the invention in which the text string voice association software records and associates a voice command with a stored text string.

FIG. 5 is a flow chart 500 illustrating the operation of an aspect of the invention in which the text string voice association software 200 records and associates a voice command with a stored text string. In block 502 the user views a list of stored text strings. This list can be obtained from the combination of the text string storage table 282 (FIG. 2) and the text string location table 252 (FIG. 2) and then be displayed to the user on the display 102 (FIG. 1), as will be described below with respect to FIGS. 6A, 6B, and 6C.

In block 504, the user selects the text string for voice command association. The user can select the text string using any one of a number of devices or methods (e.g. voice recognition) associated with the user input element 128. For example, a mouse or any other pointing device can be used to scroll through a displayed list of stored text strings presented on the display 102.

In block 506, the user records a voice command that is stored in the voice recording storage table 292, as described above with respect to FIG. 2. The storage location 268 and assigned recording ID 264 are then stored in the voice recording location table 262 as described above with respect to FIG. 2. In block 508, the stored voice recording identifier 264 is associated with the selected text string identifier 254.

In block 512, the voice recording identifier 264 and associated text string identifier 254 are placed in the match table 272 (FIG. 2) in order to complete the association of the voice command with the associated text string. As is evident from the match table 272, a particular voice recording (illustrated using recording ID 269) is associated with a particular text string (illustrated using text string ID 257) so that the text string will be invoked when the appropriate voice command is uttered by a user of the portable communication device 100.

Figure 6A:
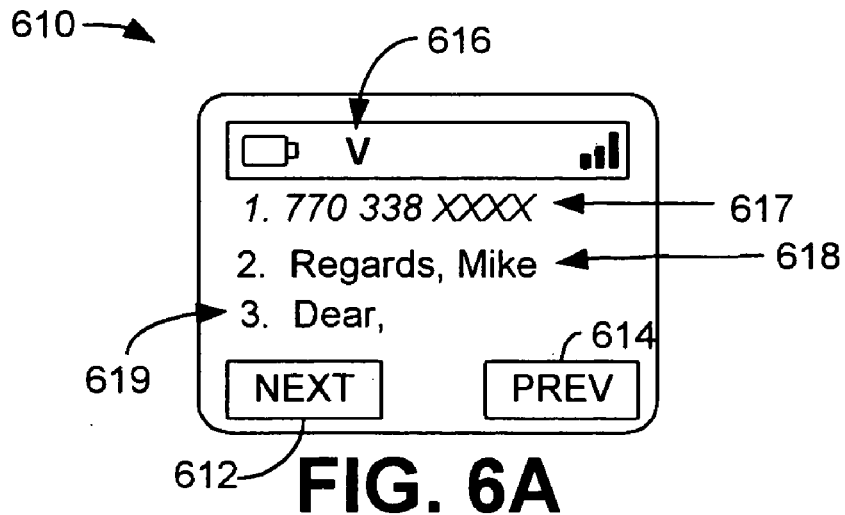
FIGS. 6A, 6B, and 6C collectively illustrate a series of screen shots displayed to a user of the portable communication device when implementing the process flow chart disclosed with respect to FIG. 5.
Figure 6B:
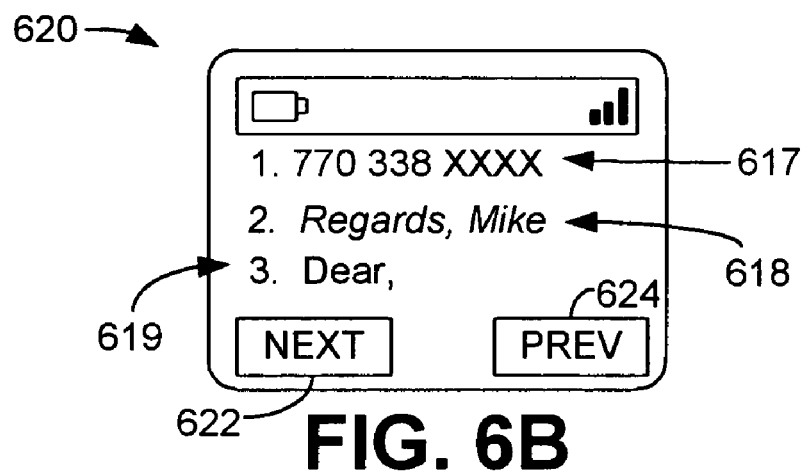
Figure 6C:
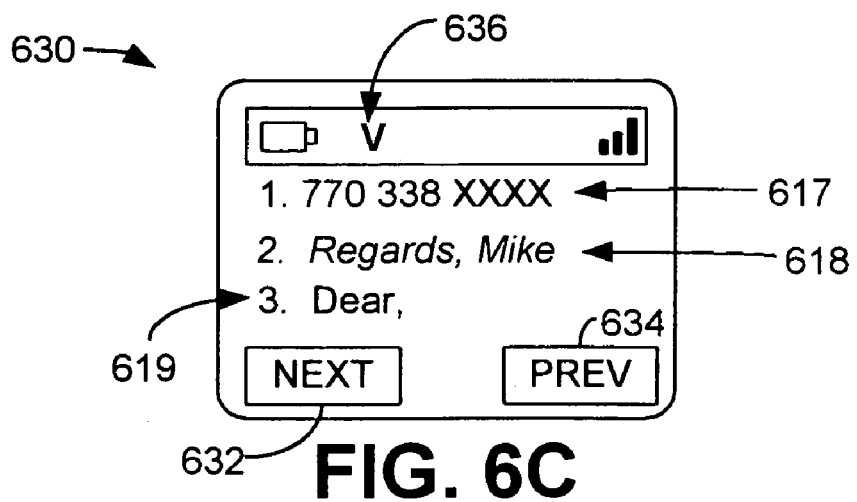

FIGS. 6A, 6B, and 6C collectively illustrate a series of screen shots displayed to a user of the portable communication device 100 when implementing the process flow chart disclosed with respect to FIG. 5. In FIG. 6A, a screen shot 610 includes a listing in the form of a menu showing stored text strings, three of which are illustrated using reference numerals 617, 618, and 619. The screen shot 610 also includes a "NEXT" button 612 and a "PREV" button 614 to allow the user to make selections. As described above, the user may navigate the menu using a pointing device associated with the user input element 128 (FIG. 1). As shown in FIG. 6A, a selected text string 617 is shown in italic type to indicate that it is selected. Further, the bold "V" 616 indicates that a voice recording is already associated with the selected text string 617.

In FIG. 6B, a user scrolls down the list until text string 618 is highlighted (in italics). As evident by the absence of the "V" in the top bar, there is no voice command associated with the text string 618. In FIG. 6C a user has recorded a voice command and has invoked the text string voice association software 200 to associate that voice command with the text string 618. The appearance of the "V" 636 indicates that a voice command is now associated with the text string 618.

Figure 7:
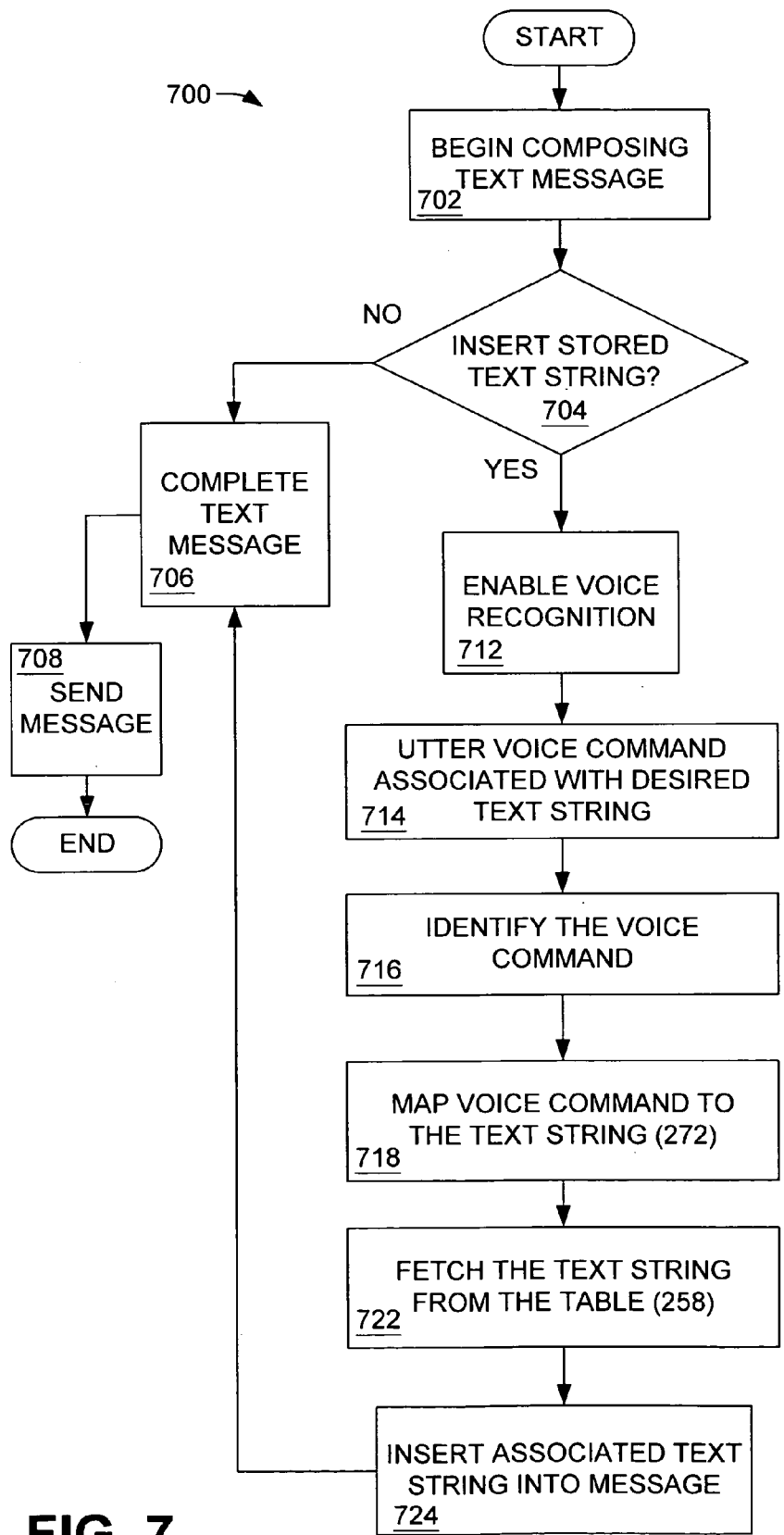
FIG. 7 is a flow chart illustrating the steps used to recall a stored text string using a voice command and insert the text string into a message.

FIG. 7 is a flow chart 700 illustrating the steps used to recall a stored text string using a voice command and insert the text string into a message. In block 702 the user of the portable communication 100 begins composing a text message. In block 704 the user determines whether he or she wants to insert a stored text string into the message. For example, the user may wish to use the text string voice association software 200 to insert an often used greeting, phone number, closing statement, or other text string into a message. If it is determined that a stored text string is not to be entered into the message, then, in block 706, the user completes entering the text message, and, in block 708, sends the message.

However, if in block 704 it was determined that the user indeed wishes to insert a stored text string into the message, then, in block 712, the voice recognition feature of the text string voice association software 200 is enabled. As described above, this can be accomplished using a dedicated key on the user input element 128, or another type of input command.

In block 714, the user utters a particular voice command that is associated with a desired stored text string. In block 716, the voice recognition software 210 (FIG. 1) determines the recording ID 264 that corresponds to the uttered voice command. In block 718, the match table 272 is searched to find the text string ID 254 that corresponds to the recording ID from step 716.

In block 722, the text string ID 254 from step 718 is used to index into the text string location table 252 to find the location of the text string to be inserted into the message. Then, in block 724, the text string voice association software 200 inserts the text string associated with the uttered voice command into the appropriate location in the message. The process flow now transfers to block 706 where the user completes the text message. In block 708 the message is sent. Of course, the text string voice association software 200 can be invoked to insert additional text strings at other locations in the message. Further, the message can be, for example, an email message, a short message system (SMS) message, a phonebook entry, an address, a text entry into an instant messaging message, or any other type of information that can be entered into the electronic device. The text string voice association software 200 (FIG. 2) associates the text portion with the information that the user desires to enter into the electronic device.

Figure 8A:
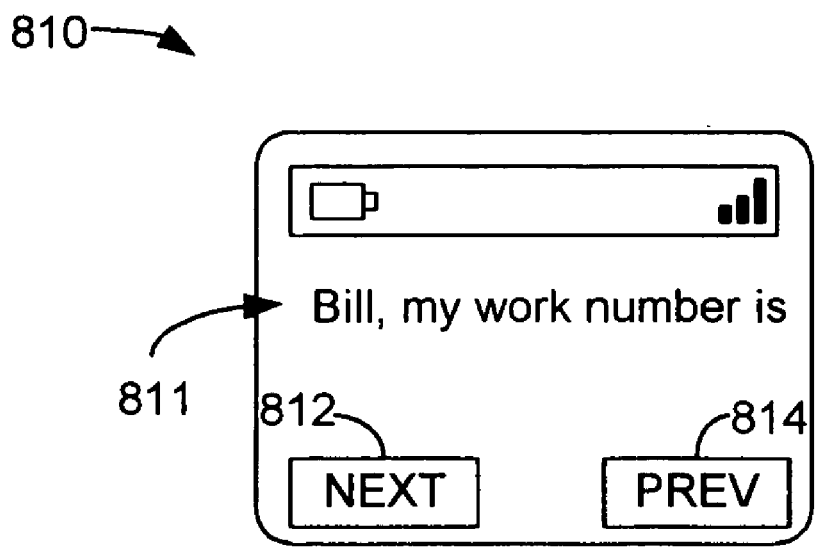
FIGS. 8A and 8B collectively illustrate a series of screen shots displayed to a user of a portable communication device when implementing the process flow chart disclosed with respect to FIG. 7.
Figure 8B:
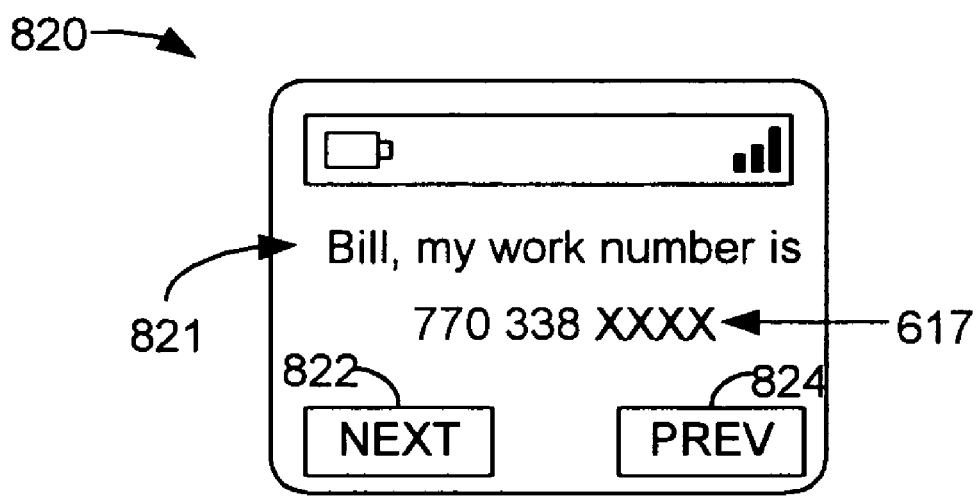

FIGS. 8A and 8B collectively illustrate a series of screen shots displayed to a user of the portable communication device 100 when implementing the process flow chart disclosed with respect to FIG. 7. In FIG. 8A, a screen shot 810 shows that the user has begun composing a text message 811 and reaches a point at which he or she would like to insert a stored text string.

In FIG. 8B, the screen shot 820 illustrates the text entered thus far 821, at which point the user desires to insert a stored text string. When the user invokes the text string voice association software 200, the user utters the voice command associated with the text string that he or she wishes to enter in the message. For example, as shown in FIG. 8B, the desired text string is the phone number "770 338 XXXX" indicated using reference numeral 617.

If the user desires to enter the phone number 617 without typing each character, the user merely utters the voice command associated with that particular text string. For example, referring back to FIG. 6A, the user knows that there is a voice command associated with the phone number 617. Assuming that the user knows the voice command that is associated with the phone number 617, and referring again to FIG. 8B, at the appropriate point in the message, the user merely utters the voice command associated with the phone number 617, and the text string voice association software 200 recalls the text string corresponding to that voice command, which in this example is the phone number 617. After the command is uttered, the phone number 617 is inserted into the message (shown in FIG. 8B), thereby saving the user the difficulty of typing the phone number into the message. If the phone number 617 is the user's work phone number, then the voice command "work number" may be the voice command associated with that number.

Figure 9A:
FIGS. 9A and 9B are graphical illustrations depicting screen shots that a user might view when reviewing various voice commands.
Figure 9B:
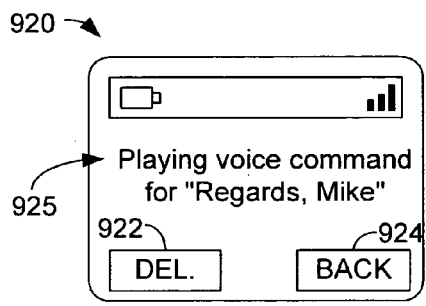

FIGS. 9A and 9B are graphical illustrations depicting screen shots that a user might view when reviewing various voice-activated text strings. FIG. 9A illustrates a screen shot 910, showing an example list of stored text strings. By scrolling through the stored text strings, three of which are illustrated using reference numerals 916, 917 and 918, the user could scroll through this list to determine whether there is a voice command associated with each of these text strings. For example, the text string 916 includes a bold "V" prior to the beginning of the text string to illustrate that a voice command is associated with the text string 916. As another example of indicating a voice command associated with a text string, the text string 917 includes a bold "V" to indicate that a voice command is associated with the text string, and also shown with an ">>" indicator and/or is shown in italics, to indicate that the text string 917 is selected.

The screen shot 910 also includes an "EDIT" button 914 that can be actuated to place the selected text string into edit mode (to be described below with respect to FIGS. 10A, 10B, and 10C) and includes a "PLAY" button 912, which can be actuated to play the voice command associated with the selected text string. The voice command can be played to a user via the audio subsystem 122 and the speaker 116 of FIG. 1. This feature is illustrated in FIG. 9B where, after pressing the play button 912, the screen shot 920 indicates 925 that the voice command corresponding to the selected text string 917 (Regards, Mike) is being played.

Returning to FIG. 9A, if no voice command is associated with a particular text string (such as text string 918), then the play button 912 would not be available. The delete ("DEL") button 922 of FIG. 9B can be actuated if the user wishes to delete the voice command associated with the selected text string, while the back button 924 returns the user to the screen shot 910 shown in FIG. 9A.

Figure 10A:
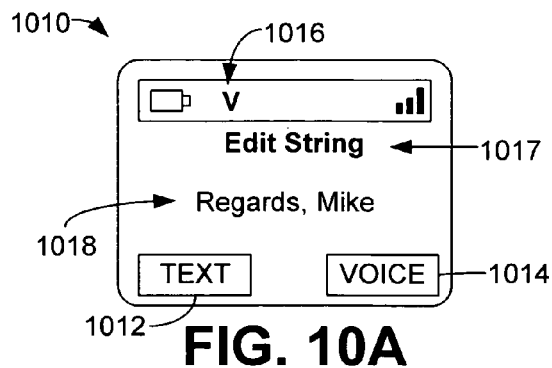
FIGS. 10A, 10B, and 10C collectively illustrate some examples of editing the voice command and the associated text string.
Figure 10B:
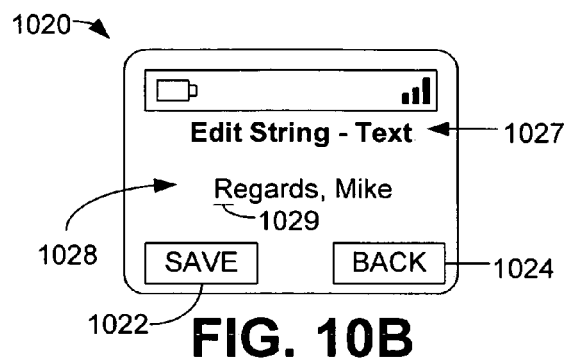
Figure 10C:
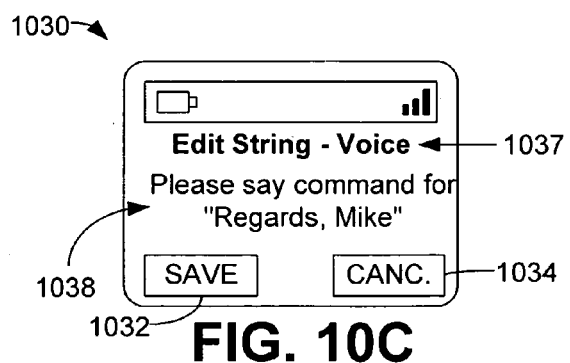

FIGS. 10A, 10B, and 10C collectively illustrate some examples of editing the voice-activated text strings of the invention. In FIG. 10A, the screen shot 1010 shows the selected text string 1018 after the edit button 914 of FIG. 9A has been actuated. As shown in FIG. 10A, the user is made aware of the edit mode by the "Edit String" indicator 1017 and is given the option of editing either the text using the "TEXT" button 1012 or editing the voice using the "VOICE" button 1014. The bold "V" 1016 in the top bar of the screen shot 101 reminds the user that there is a voice command associated with the text string 1018. If there was not already a voice command associated with the text string 1018, the "VOICE" button 1014 would not be available to the user and the "V" would not be visible in the top bar.

In FIG. 10B, the user has indicated that he or she desires to edit the text string 1018 shown in FIG. 10A. Therefore, in FIG. 10B, the "Edit String—Text" indicator 1027 appears and a cursor 1029 appears under the stored text string 1028. By using a pointing and actuating device or method associated with the user input element 128, the user can edit the text string 1028. When the user is finished editing the test string 1028, the user actuates either the "SAVE" button 1022, to save the edited text string, or actuates the "BACK" button 1024, to return to the screen shot 1010 shown in FIG. 10A.

In FIG. 1C, a user has actuated the voice button 1014 shown in FIG. 10A and is now given the option of redefining the voice command that corresponds to the selected text string 1018. Therefore, the "Edit String—Voice" indicator 1037 appears on the display. The user is prompted with the indicator 1038 to utter a new voice command that corresponds to the text string 1018. If the user is satisfied with the text string, the user can actuate the "SAVE" button 1032. If the user wishes to return to a previous menu, the cancel ("CANC.") button 1034 can be actuated.

In this manner, various methods of associating a particular text string with a particular voice command, and with inserting the test string into a message have been illustrated.

While various embodiments of the invention have been described, it will be apparent to those of ordinary skill in the art that many more embodiments and implementations are possible that are within the scope of this invention. For example, while illustrated using a portable communication handset or a PDA, the invention is applicable to any portable communication device that stores or sends text messages. In another embodiment, aspects of the invention could be used to enter repetitive information into an application, such as a phonebook, where there may be a common area code for a group of phone number entries. All such modifications and variations are intended to be included herein within the scope of this disclosure and the present invention and protected by the following claims.

What is claimed is:

1. A method for entering predetermined text into an electronic device, the method comprising:
   entering a predetermined text portion into the electronic device;
   storing the predetermined text portion in a memory;
   recording a voice portion into the electronic device;
   storing the voice portion in the memory;
   associating the voice portion with the predetermined text portion;
   using voice recognition to recall the predetermined text portion that is associated with the voice portion;
   associating the predetermined text portion with information to be entered in the electronic device; and
   inserting the predetermined text portion into the information to be entered in the electronic device.

2. The method of claim 1, wherein the predetermined text portion and the voice portion are associated in the memory.

3. The method of claim 1, wherein voice recognition is used to identify the predetermined text portion.

4. The method of claim 1, wherein the predetermined text portion and the voice portion are non-permanently associated.

5. The method of claim 1, wherein the information to be entered is chosen from the group consisting of an email message, a short message system (SMS) message, a phonebook entry, an address, and text for an instant messaging message.

6. A system for entering predetermined text into an electronic device, comprising:
   means for entering a predetermined text portion into the electronic device;
   a first memory means for storing the predetermined text portion;
   a recording means for recording a voice portion into the electronic device;
   a second memory means for storing the voice portion;
   means for associating the voice portion with the predetermined text portion;
   means for using voice recognition to recall the predetermined text portion that is associated with the voice portion;
   means for associating the predetermined text portion with information to be entered in the electronic device; and
   means for inserting the predetermined text portion into the information to be entered in the electronic device.

7. The system of claim 6, wherein the predetermined text portion and the voice portion are associated in the memory.

8. The system of claim 6, wherein voice recognition is used to identify the predetermined text portion.

9. The system of claim 6, further comprising means for non-permanently associating the predetermined text portion and the voice portion.

10. The system of claim 6, wherein the information to be entered is chosen from the group consisting of an email message, a short message system (SMS) message, a phonebook entry, an address, and text for an instant messaging message.

11. A computer readable medium having a program for entering predetermined text into an electronic device, the program comprising logic configured to perform the steps of:
   entering a predetermined text portion into the electronic device;
   storing the predetermined text portion in a memory;
   recording a voice portion into the electronic device;
   storing the voice portion in the memory;

associating the voice portion with the predetermined text portion;

using voice recognition to recall the predetermined text portion that is associated with the voice portion;

associating the predetermined text portion with information to be entered in the electronic device; and inserting the predetermined text portion into the information to be entered in the electronic device.

12. The program of claim 11, wherein the predetermined text portion and the voice portion are associated in the memory.

13. The program of claim 11, wherein voice recognition is used to identify the predetermined text portion.

14. The program of claim 11, wherein the predetermined text portion and the voice portion are non-permanently associated.

15. The program of claim 11, wherein the information to be entered is chosen from the group consisting of an email message, a short message system (SMS) message, a phonebook entry, an address, and text for an instant messaging message.

16. A system for entering predetermined text into an electronic device, comprising:

an input element for entering a predetermined text portion into the electronic device;

a first memory for storing the predetermined text portion;

a software code segment for recording a voice portion into the electronic device;

a second memory for storing the voice portion;

a software code segment for associating the voice portion with the predetermined text portion;

a software code segment for associating the predetermined text portion with information to be entered in the electronic device; and voice recognition software to recall the predetermined text portion that is associated with the voice portion, where the input element inserts the predetermined text portion associated with the information to be entered into the electronic device.

17. The system of claim 16, wherein the text portion and the voice portion are associated in the memory.

18. The system of claim 16, wherein voice recognition is used to identify the text portion.

19. The system of claim 16, wherein the software code segment for associating the voice portion with the text portion non-permanently associates the text portion and the voice portion.

20. The system of claim 16, wherein the information to be entered is chosen from the group consisting of an email message, a short message system (SMS) message, a phonebook entry, an address, and text for an instant messaging message.

* * * * *